US011962086B2

(12) United States Patent
Karilainen et al.

(10) Patent No.: US 11,962,086 B2
(45) Date of Patent: Apr. 16, 2024

(54) SLOT ANTENNA AND ELECTRONIC DEVICE COMPRISING SAID SLOT ANTENNA

(71) Applicant: Huawei Technologies Co., Ltd., Shenzhen (CN)

(72) Inventors: Antti Karilainen, Kista (SE); Konstantin Sokolov, Helsinki (FI); Dong Liu, Shenzhen (CN); Zlatoljub Milosavljevic, Helsinki (FI); Joonas Krogerus, Helsinki (FI); Jouni Pennanen, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 17/424,357

(22) PCT Filed: Jan. 29, 2019

(86) PCT No.: PCT/EP2019/052078
§ 371 (c)(1),
(2) Date: Jul. 20, 2021

(87) PCT Pub. No.: WO2020/151839
PCT Pub. Date: Jul. 30, 2020

(65) Prior Publication Data

US 2022/0115789 A1 Apr. 14, 2022

(30) Foreign Application Priority Data

Jan. 22, 2019 (WO) ................ PCT/EP2019/051419

(51) Int. Cl.
*H01Q 13/10* (2006.01)
*H01Q 1/24* (2006.01)

(52) U.S. Cl.
CPC ............... *H01Q 13/10* (2013.01); *H01Q 1/24* (2013.01)

(58) Field of Classification Search
CPC ........... H01Q 13/10; H01Q 1/24; H01Q 1/243
See application file for complete search history.

(56) References Cited

U.S. PATENT DOCUMENTS 7,830,322 B1 11/2010 Oliver et al.
2002/0060647 A1 5/2002 Masuda et al.
(Continued)

FOREIGN PATENT DOCUMENTS

CA 2788962 A1 3/2013
CN 102870276 A 1/2013
(Continued)

OTHER PUBLICATIONS

ITU-T H.261 (Mar. 1993), Line Transmission of Non-Telephone Signals, Video Codec for Audiovisual Services AT px64 kbits, total 29 pages.

(Continued)

*Primary Examiner* — Daniel D Chang
(74) *Attorney, Agent, or Firm* — Conley Rose, P.C.

(57) ABSTRACT

A slot antenna comprising a first conductive structure, a second conductive structure, and an antenna feed coupled to the first conductive structure. The first conductive structure is wholly or partially enclosed by the second conductive structure and comprises a conductive surface and a non-conductive pattern. The non-conductive pattern comprises a longitudinal slot and a lateral slot extending at an angle from the longitudinal slot.

26 Claims, 6 Drawing Sheets

(56) References Cited

U.S. PATENT DOCUMENTS

| | | | | |
|---|---|---|---|---|
| 2010/0123632 | A1 | 5/2010 | Hill et al. | |
| 2011/0241948 | A1 | 10/2011 | Bevelacqua et al. | |
| 2013/0082884 | A1* | 4/2013 | Gummalla | H01Q 13/10 343/702 |
| 2013/0293424 | A1* | 11/2013 | Zhu | H01Q 1/44 343/702 |
| 2014/0266938 | A1 | 9/2014 | Ouyang et al. | |
| 2015/0270619 | A1 | 9/2015 | Zhu et al. | |
| 2016/0049734 | A1 | 2/2016 | Kim et al. | |
| 2017/0054196 | A1 | 2/2017 | Hu et al. | |
| 2018/0115053 | A1 | 4/2018 | Hu et al. | |
| 2021/0376477 | A1 | 12/2021 | Chen et al. | |

FOREIGN PATENT DOCUMENTS

| | | | |
|---|---|---|---|
| CN | 103384026 | A | 11/2013 |
| CN | 103842931 | A | 6/2014 |
| CN | 104064877 | A | 9/2014 |
| CN | 105940548 | A | 9/2016 |
| CN | 106469844 | A | 3/2017 |
| CN | 109547782 | A | 3/2019 |
| CN | 110166772 | A | 8/2019 |
| WO | 2017196957 | A1 | 11/2017 |
| WO | 2019072366 | A1 | 4/2019 |
| WO | 2020047867 | A1 | 3/2020 |

OTHER PUBLICATIONS

ITU-T H.262 (Feb. 2012), Series H: Audiovisual and Multimedia Systems, Infrastructure of audiovisual services—Coding of moving video Information technology—Generic coding of moving pictures and associated audio Information: Video: Frame packing arrangement signalling for 3D content, total 238 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

Document: JVET-K1001-v5, Benjamin Bross et al, Versatile Video Coding (Draft 2), Joint Video Experts Team (JVET) of ITU-T SG 16 WP 3 and ISO/IEC JTC 1/SC 29/WG 11, 11th Meeting: Ljubljana, SI, Jul. 10-18, 2018, total 136 pages.

Wu, B., et al., "low profile bandwidth enhanced type Slot antenna with waveguide back cavity integrated on substrate", Journal of Taishan University, vol. 35, No. 3, May 2013, 10 pages. With English Translation.

Nader Behdad et al, A Wideband Bi-Semicircular Slot Antenna, Jul. 2004, 5 pages.

Nader Behdad et al, A Multiresonant Single-Element ideband Slot Antenna, IEEE Antennas and Wireless Propagation Letters, vol. 3, 2004, 4 pages.

Valentina Palazzi et al, A Novel Additive-Manufactured Multiple-Infill Ultra-Lightweight Cavity-Backed Slot Antenna for UWB Applications , Proceedings of the 47th European Microwave Conference, Oct. 10-12, 2017, Nuremberg, German, 4 pages.

Hani A. Ghali et al, Broad-Band and Circularly Polarized Space-Filling-Based Slot Antennas, IEEE Transactions on Microwave Theory and Techniques, vol. 53, No. 6, Jun. 2005, 5 pages.

Siou-Jhen Lin et al, Monopolar Patch Antenna With Dual-Band and Wideband Operations, IEEE Transactions on Antennas and Propagation, vol. 56, No. 3, Mar. 2008, 4 pages.

H. G. Booker, Slot Aerials and Their Relation To Complementary Wire Aerials(Babinets Principle), May 3, 1946, 7 pages.

Grzegorz Adamiuk et al, UWB Antennas for Communication Systems, Proceedings of the IEEE, vol. 100, No. 7, Jul. 2012, 14 pages.

Bhobe AU et al: "Wide-Band Slot Antennas With CPW Feed Lines: Hybrid and Log-Periodic Designs", IEEE Transactions on Antennas and Propagation, IEEE, USA, vol. 52, No. 10, Oct. 1, 2004, XP001209991, 10 pages.

Database Compendex [Online] Engineering Information, Inc., New York, NY, US; Ali J et al: "Cantor fractal-based printed slot antenna for dual band wireless applications," Database accession No. E20145100331543 ; and International Journal of Microwave and Wireless Technologies, Mar. 1, 2016 Cambridge University Press GBR, vol. 8, No. 2, Mar. 1, 2016, 19 pages.

* cited by examiner

SLOT ANTENNA AND ELECTRONIC DEVICE COMPRISING SAID SLOT ANTENNA

CROSS-REFERENCE TO RELATED APPLICATIONS

This is a U.S. National Stage of International Patent Application No. PCT/EP2019/052078 filed on Jan. 29, 2019, which claims priority to International Patent Application No. PCT/EP2019/051419 filed on Jan. 22, 2019, both of which are hereby incorporated by reference in their entireties.

TECHNICAL FIELD

The disclosure relates to a slot antenna comprising at least a first conductive structure, a second conductive structure, and at least one antenna feed coupled to the first conductive structure, as well as an electronic device comprising the slot antenna.

BACKGROUND

Electronic devices need to support more and more radio signal technology such as 2G/3G/4G radio. For coming 5G radio technology, the frequency bands will be expanded to cover frequencies up to 6 GHZ, thus requiring the addition of a number of new wide-band antennas in addition to the existing antennas.

Conventionally, the antennas of an electronic device are arranged next to the display, such that the display does not interfere with the efficiency and frequency bandwidth of the antenna. However, the movement towards very large displays, covering as much as possible of the electronic device, makes the space available for the antennas very limited, forcing either the size of the antennas to be significantly reduced, and its performance impaired, or a large part of the display to be inactive.

Furthermore, wide-band antennas usually have a configuration which is sub-optimal for electronic devices such as mobile phones and tablets, as they have too large dimensions and are designed in free-space conditions. On-ground antennas such as patch antennas suffer from relatively low bandwidth, and frequently require coupled resonators such as stacked patches and impedance matching networks for wide-band operations, but simultaneously increases the thickness of the antenna. Slot antennas, on the other hand, can have the desired bandwidth but either have too large dimensions or a configuration which limits the radiation to two directions.

SUMMARY

It is an object to provide an improved antenna structure. The foregoing and other objects are achieved by the features of the independent claims. Further implementation forms are apparent from the dependent claims, the description, and the figures.

According to a first aspect, there is provided a slot antenna comprising at least a first conductive structure, a second conductive structure, and at least one antenna feed coupled to the first conductive structure, the first conductive structure being at least partially enclosed by the second conductive structure, the first conductive structure comprising a conductive surface and a non-conductive pattern, the non-conductive pattern comprising at least one longitudinal slot and at least one lateral slot extending at an angle from said longitudinal slot (6*a*).

Such a slot antenna is, due to its longitudinal shape, very flexible and can be easily integrated in a modern mobile electronic device or any other device with similar space requirements, while still having a wide band covering necessary 5G frequency bands. The slot antenna can be formed with the help of other, existing components, since the slot antenna works even at very small distances from the reference ground of the device.

In a possible implementation form of the first aspect, the non-conductive pattern comprises at least two longitudinal slots extending in parallel and at least two lateral slots interconnecting the longitudinal slots, the non-conductive pattern at least partially enclosing the conductive surface. The lateral slots provide the needed resonance frequencies for wide-band operation, facilitating a multi-resonant slot antenna having at least two resonance modes, allowing more frequency bands and bandwidth to be obtained from the same antenna space as compared to before.

In a further possible implementation form of the first aspect, the non-conductive pattern encloses all of the conductive surface, allowing the non-conductive pattern to be formed by means of a gap between two components.

In a further possible implementation form of the first aspect, the conductive surface comprises a first section and at least one further section, the non-conductive pattern at least partially separating the first section from the further section, facilitating a multi-resonant slot antenna operating at at least two resonance frequencies.

In a further possible implementation form of the first aspect, the non-conductive pattern encloses at least the first section of the conductive surface, at least partially separating the first section from the further section of the conductive surface, allowing the non-conductive pattern to be configured independently of the surrounding components.

In a further possible implementation form of the first aspect, the first section of the conductive surface is coupled to the further section(s) of the conductive surface by means of at least one of a conductive connection, a capacitive connection, and an inductive connection, the connection extending across one of the longitudinal slots or one of the lateral slots, facilitating interconnections which allow the conductive surface to be divided into any suitable number of sections by means of slots.

In a further possible implementation form of the first aspect, the first conductive structure is coupled to the second conductive structure by means of a conductive connection extending across one of the two longitudinal slots, facilitating tuning of the resonance frequency of at least one of the resonance modes.

In a further possible implementation form of the first aspect, the lateral slot completely separates the first section from the further section of the conductive surface, facilitating excitation of more than one resonance frequency in the slot antenna, hence increasing the efficiency of the slot antenna.

In a further possible implementation form of the first aspect, the slot antenna further comprises at least one floating parasitic plate extending essentially parallel to the conductive surface, the floating parasitic plate being at least partially juxtaposed with one of the first section and the further section of the conductive surface. The floating parasitic plate and the remainder of the slot antenna excite each other electrically, and is used to tune the resonance modes at suitable frequencies.

In a further possible implementation form of the first aspect, the floating parasitic plate is separated from the conductive surface by means of a non-conductive insulator layer or an air gap, allowing the distance between the floating parasitic plate and the conductive surface to be configured so as achieve a desired effect.

In a further possible implementation form of the first aspect, the antenna feed is coupled to the first conductive structure by means of at least one of a conductive connection, a capacitive connection, and an inductive connection, the coupling extending across one of the longitudinal slots or one of the lateral slots, facilitating placement of the antenna feed at any location of the antenna volume in such a way that the reference ground is connected to surrounding conductive surfaces.

In a further possible implementation form of the first aspect, the first conductive structure is substantially plate shaped, allowing the slot antenna to comprise different both two-dimensional and three-dimensional configurations, depending on the conditions of the specific slot antenna.

In a further possible implementation form of the first aspect, the slot antenna further comprises a cavity, the first conductive structure and the second conductive structure forming boundaries of the cavity, the first conductive structure being arranged such that the non-conductive pattern is juxtaposed with the cavity, facilitating an omnidirectional slot antenna.

In a further possible implementation form of the first aspect, the cavity is at least partially filled with a non-conductive material, providing a stable construction which may form a support for the conductive surface.

In a further possible implementation form of the first aspect, the slot antenna comprises two antenna feeds, a first feed comprising a capacitive connection coupled to said floating parasitic plate, and a second feed comprising an inductive connection coupled to said cavity. The capacitive antenna feed primarily excites the resonant frequencies of the floating parasitic plate, while the inductive antenna feed excites a further resonant frequency, typically at lower bands than the resonant frequencies excited by the floating parasitic plate.

In a further possible implementation form of the first aspect, the slot antenna further comprises a capacitive grounding strip coupled to the floating parasitic plate, facilitating a spatially efficient grounding of the slot antenna.

In a further possible implementation form of the first aspect, the conductive surface of the first conductive structure comprises conductive paint, allowing a conductive surface to be provided quickly and easily, and in complete conformance with surrounding surfaces and components.

In a further possible implementation form of the first aspect, the first conductive structure comprises a layer of flexible, conductive sheet material, allowing an existing component such as a printed circuit board to comprise the first conductive structure.

According to a second aspect, there is provided an electronic device comprising a plurality of electronic components, a glass cover, a display, a frame, and at least one slot antenna according to the above, the glass cover, the display and the frame enclosing the electronic components and at least partially the slot antenna, the second conductive structure of the slot antenna comprising at least one of the display, the frame and the electronic components.

The electronic device may have a large display, while still having a wide band covering necessary 5G frequency bands. The lateral slots provide the needed resonance frequencies for wide-band operation. As the slot antenna is formed with by means of other, existing components, the slot antenna is not only spatially efficient but can be arranged in juxtaposition with the display, i.e. on-ground.

In a possible implementation form of the second aspect, the first conductive structure of the slot antenna is a printed circuit board, a flexible printed circuit board, or a liquid crystal polymer board, allowing at least a part of the slot antenna to be formed without a need for additional components.

In a further possible implementation form of the second aspect, the frame comprises the second conductive structure of the slot antenna, the frame comprising a recess at least partially bridged by the first conductive structure of the slot antenna, allowing at least a part of the slot antenna to be placed along the edge of the electronic device and not completely covered by other conductive components such as the display.

In a further possible implementation form of the second aspect, the second conductive structure of the slot antenna comprises the frame and at least one electronic component, a gap between the frame and the electronic component being at least partially bridged by the first conductive structure of the slot antenna, facilitating a well-protected and stable antenna structure which is invisible from the outside and which is highly spatially efficient.

In a further possible implementation form of the second aspect, the electronic component is a battery, increasing the mechanical robustness of in particular thin electronic devices by placing the slot antennas in a close proximity to sturdy, structural components such as batteries.

In a further possible implementation form of the second aspect, the longitudinal slots of the first conductive structure of the slot antenna extend in parallel with a longitudinal extension of the frame, the essentially longitudinal shape of the antenna allowing one or several slot antennas to take up as much space longitudinally as possible and necessary, while taking up as little space as possible in the other directions.

In a further possible implementation form of the second aspect, the antenna feed of the slot antenna is coupled to the first conductive structure of the slot antenna by means of a flexible printed circuit or a liquid crystal polymer board and a screw, facilitating a slot antenna which has as small dimensions as possible.

In a further possible implementation form of the second aspect, the floating parasitic plate of the slot antenna is fixedly connected to a surface of the glass cover facing the first conductive structure, facilitating a simple solution to arranging the floating parasitic plate close to the remainder of the slot antenna without requiring additional components.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1A:
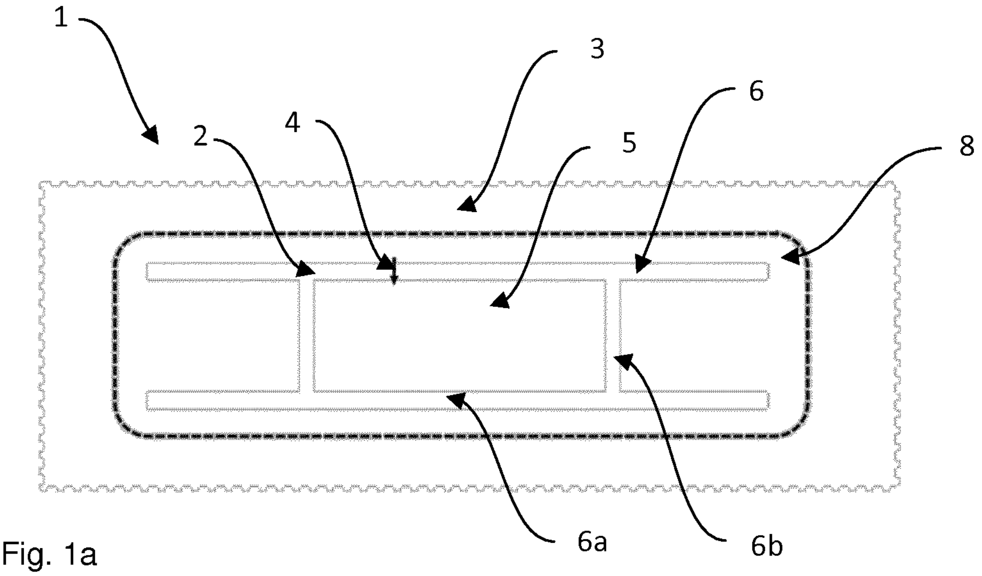
FIG. 1*a* shows a schematic top view of a slot antenna in accordance with one embodiment of the present invention.
Figure 1B:
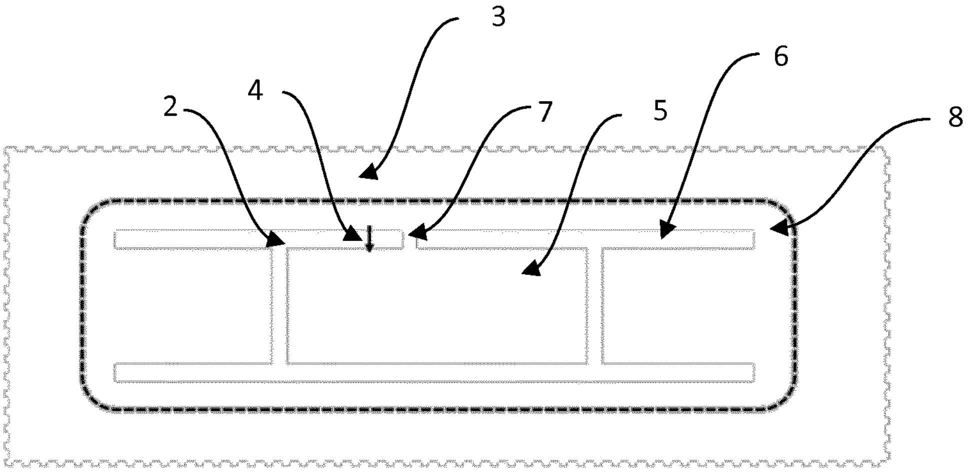
FIG. 1*b* shows a schematic top view of a section of a slot antenna in accordance with a further embodiment of the present invention.
Figure 1C:
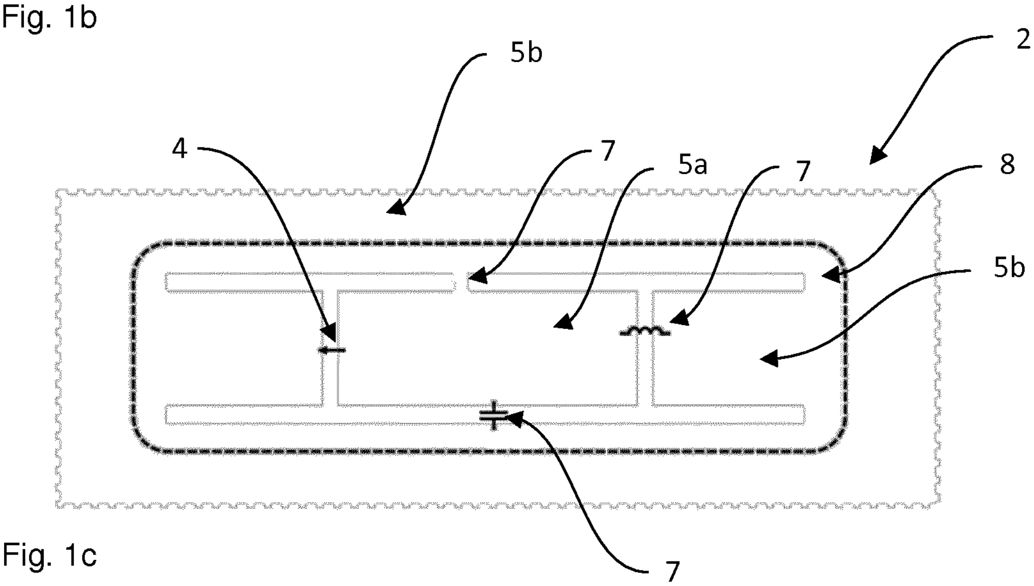
FIG. 1*c* shows a schematic top view of a section of a slot antenna in accordance with yet another embodiment of the present invention.

FIGS. 1*a* to 1*c* show embodiments of a slot antenna 1 comprising a first conductive structure 2, a second conductive structure 3, and at least one antenna feed 4 coupled to the first conductive structure 2. The first conductive structure 2 is at least partially enclosed by the second conductive structure 3, as shown more clearly in FIGS. 2*a* to 2*c*.

Figure 2A:
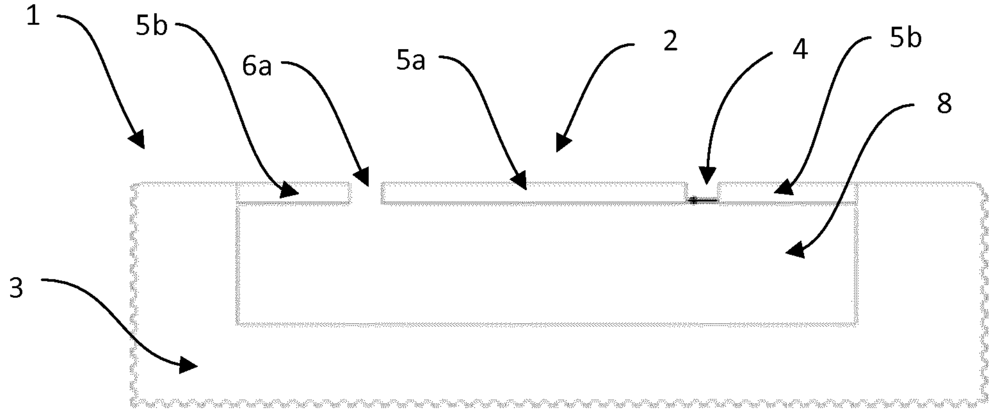
FIG. 2*a* shows a schematic cross-sectional view of a slot antenna in accordance with one embodiment of the present invention.
Figure 2B:
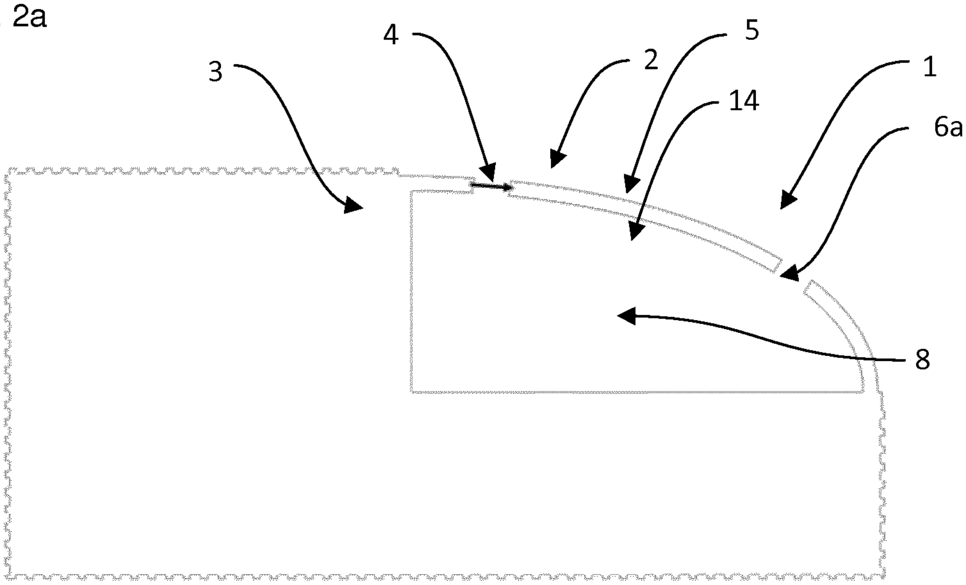
FIG. 2*b* shows a schematic cross-sectional view of a slot antenna in accordance with a further embodiment of the present invention.
Figure 2C:
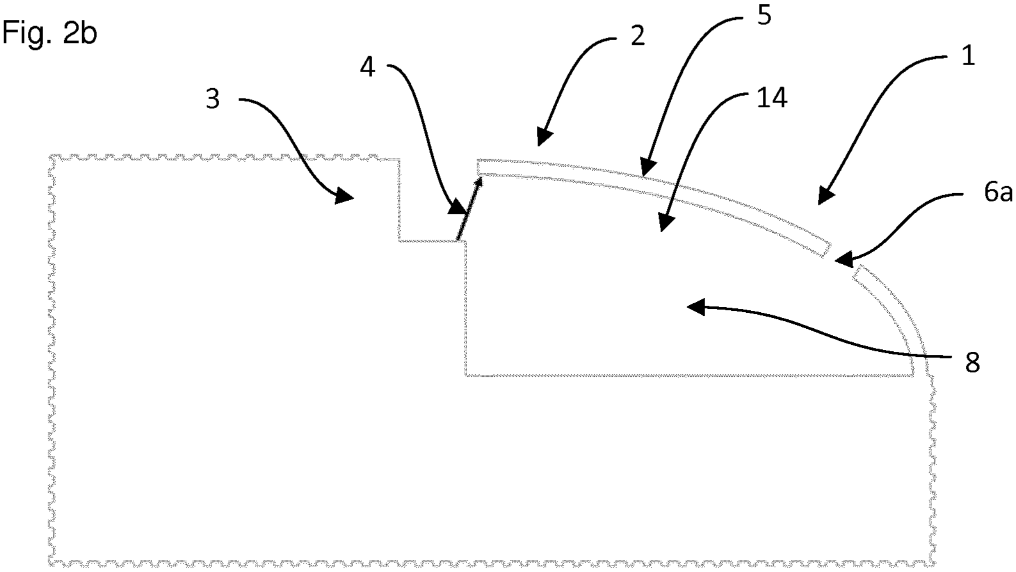
FIG. 2*c* shows a schematic cross-sectional view of a slot antenna in accordance with yet another embodiment of the present invention.

The first conductive structure 2 comprises a conductive surface 5 and a non-conductive pattern 6, as shown schematically in FIGS. 1*a* to 1*c*. The non-conductive pattern 6 may enclose the conductive surface 5 partially, as shown in FIGS. 1*b*, 1*c*, and 2*a*, or enclose the conductive surface 5 completely such that the conductive surface 5 forms a separate, conductive island, as shown in FIGS. 1*a*, 2*b*, and 2*c*.

Figure 3A:
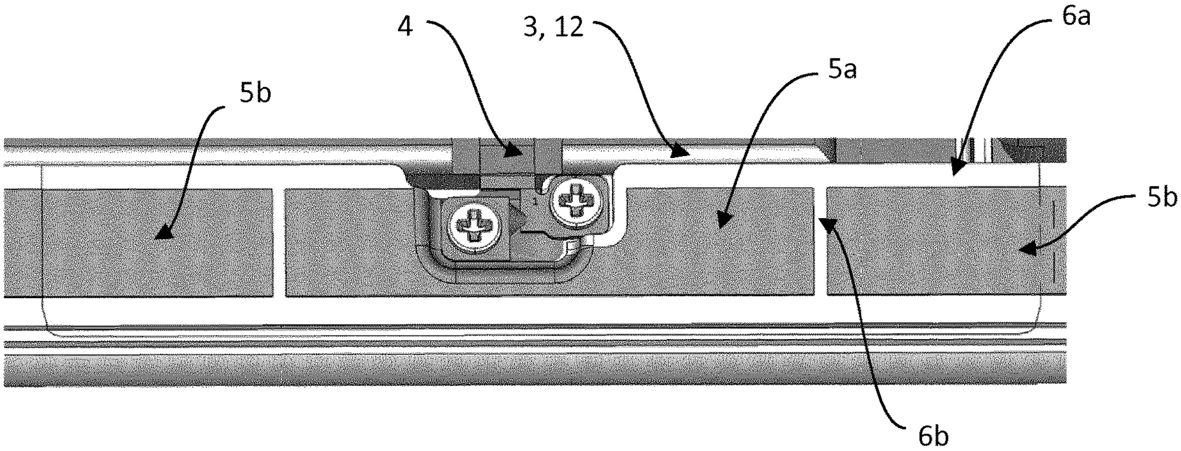
FIG. 3*a* shows a partial side view of an electronic device in accordance with one embodiment of the present invention.
Figure 3B:
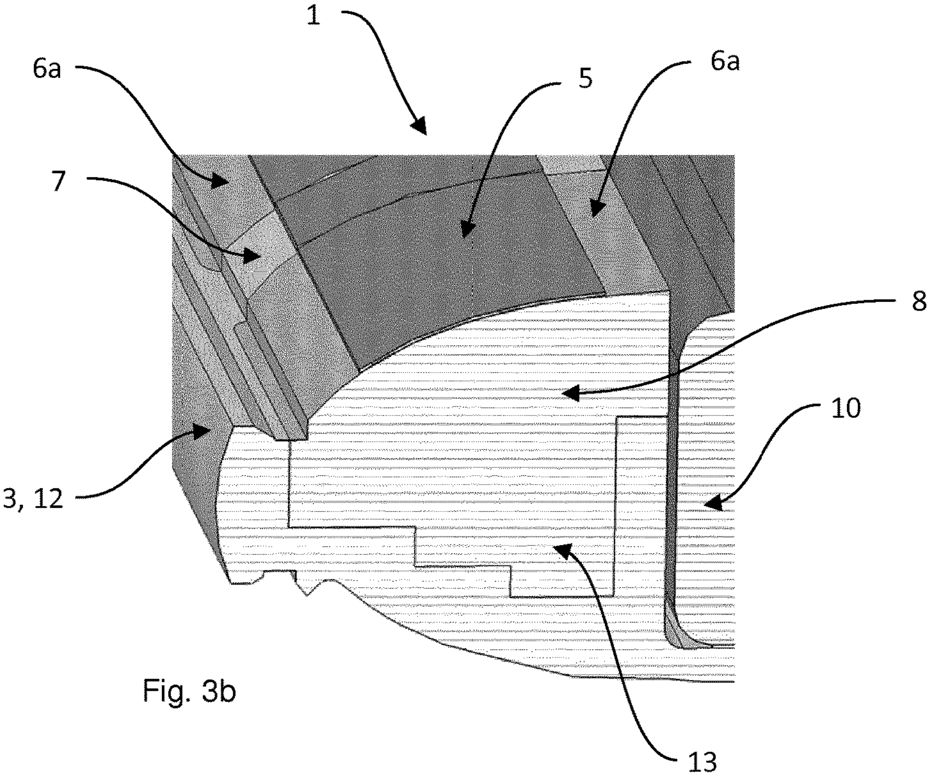
FIG. 3*b* shows a partial cross-sectional view of the embodiment of FIG. 3*a;*
Figure 4A:
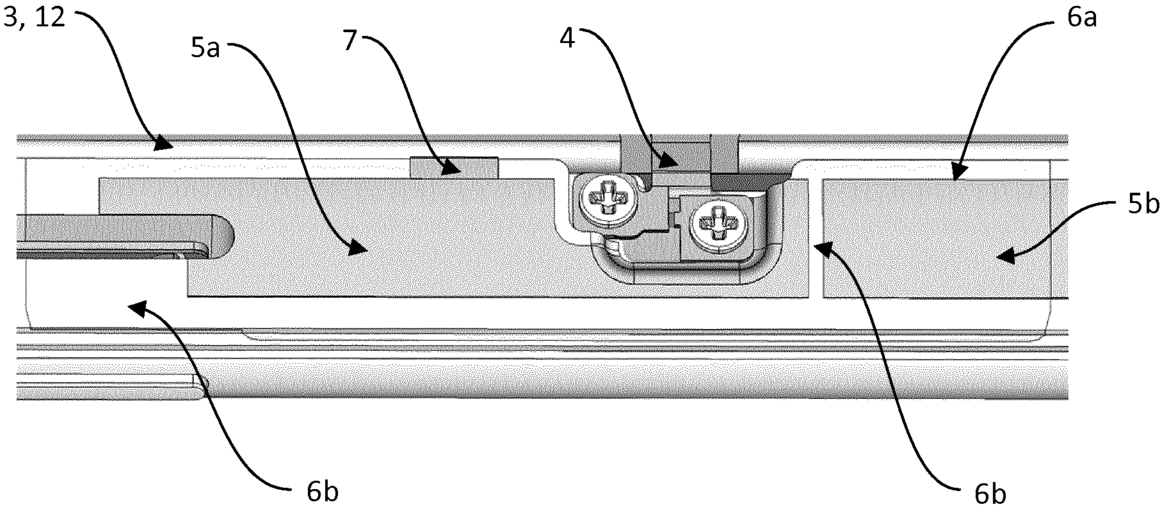
FIG. 4*a* shows a partial side view of an electronic device in accordance with one embodiment of the present invention.

The conductive surface 5 may comprise a first section 5*a* and at least one further section 5*b*. The non-conductive pattern 6 separates, at least partially, the first section 5*a* from the further section 5*b*, as shown in FIGS. 1*b*, 1*c*, and 2*a*, as well as in FIGS. 3*a* to 4*b*. The non-conductive pattern 6 separates, at least partially, the first section 5*a* from one further section 5*b* of the conductive surface 5, as shown in FIGS. 4*a*, 6*a*, and 6*c*, or from several further sections 5*b*, as shown in FIG. 3*a*.

Figure 6A:
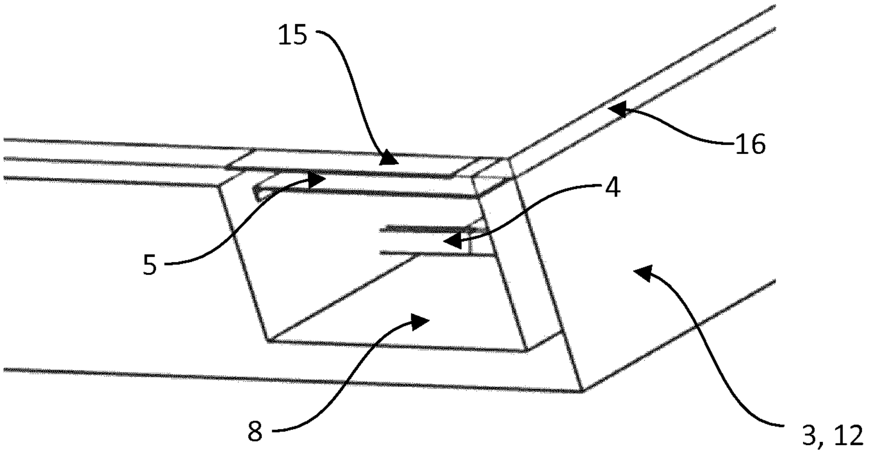
FIG. 6*a* shows a schematic cross-sectional view of a slot antenna in accordance with a further embodiment of the present invention.
Figure 6B:
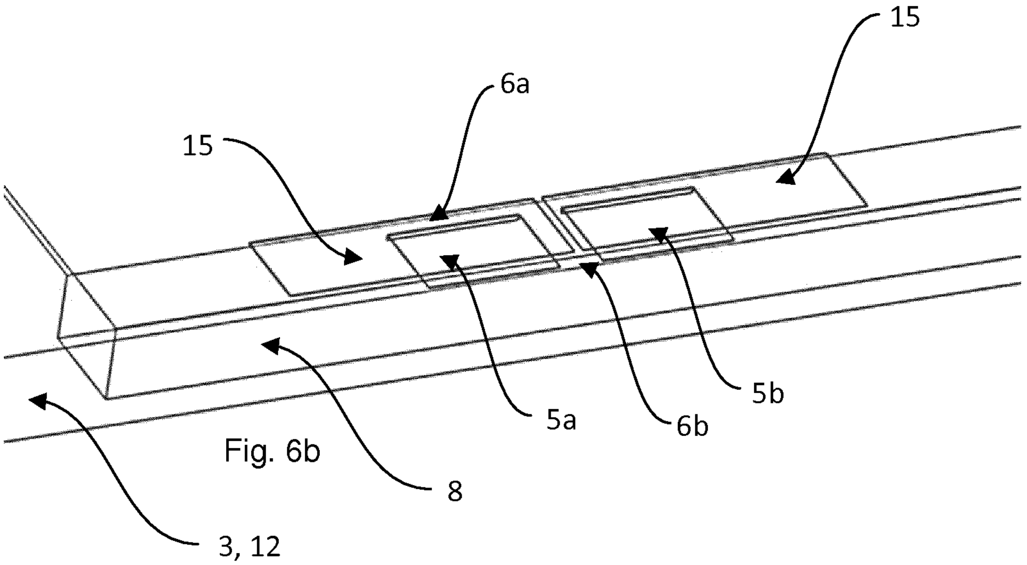
FIG. 6*b* shows a transparent partial perspective view of a slot antenna in accordance with a further embodiment of the present invention.
Figure 6C:
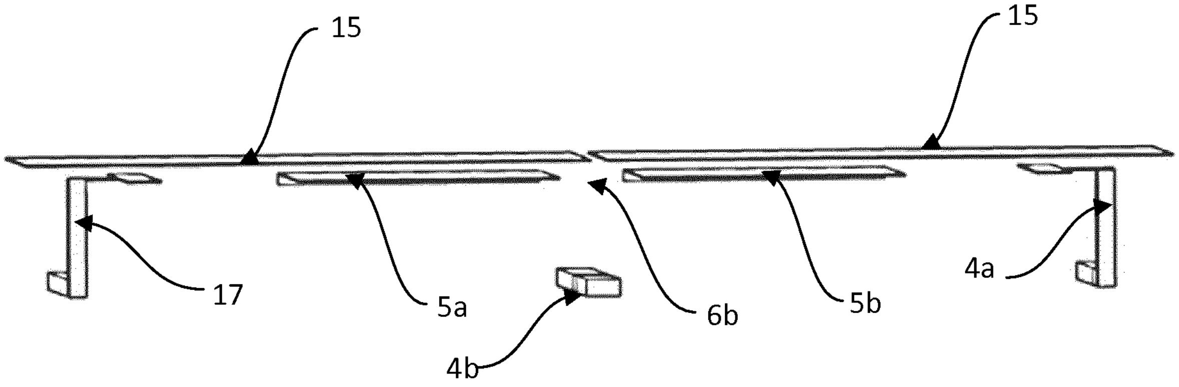
FIG. 6*c* shows a perspective view of a slot antenna in accordance with a further embodiment of the present invention.

In some embodiments, shown in FIGS. 6*a* to 6*c*, the non-conductive pattern 6 comprises one longitudinal slot 6*a* and at least one lateral slot 6*b* extending at an angle from the longitudinal slot 6*a*.

In further embodiments, the non-conductive pattern 6 comprises two longitudinal slots 6*a* extending essentially in parallel and at least two lateral slots 6*b* interconnecting the two longitudinal slots 6*a*, as shown schematically in FIGS. 1*a* to 1*c*. The non-conductive pattern 6 may comprise any suitable number of lateral slots 6*b* interconnecting the two longitudinal slots 6*a*. The number of lateral slots 6*b* is chosen to provide the needed resonance frequencies for wide-band operation. The lateral slots 6*b* may be identical, as shown in FIG. 3*a*, or have different configurations, as shown in FIG. 4*a*. Furthermore, the lateral slots 6*b* may be in the form of straight channels or have any suitable shape. The main extent of the lateral slots 6*b* extends essentially perpendicular to the main extent of the longitudinal slots 6*a*.

The longitudinal slots 6*a* are preferably much longer than the lateral slots 6*b*, such that the main extent of the non-conductive pattern is one-dimensional. This allows the slot antenna to be configured having a small width and thickness, and a, relatively speaking, far larger length. The lateral slots 6*b* are preferably less than a quarter wavelength λ/4 long at the lowest operating frequency.

In one embodiment, the lateral slot 6*b* completely separates the first section 5*a* from the further section 5*b* of the conductive surface 5, completely separating the first section 5*a* from the further section 5*b*. The two sections can be equal in surface area, or have different surface areas due to a difference in dimensions in the direction of the longitudinal slot 6*a* or in the direction of the lateral slot 6*b*.

In one embodiment, the first conductive structure 2 is coupled to the second conductive structure 3 by means of a conductive connection 7 extending across one of the two longitudinal slots 6*a*, as shown in FIGS. 1*b* and 1*c*.

Furthermore, the first section 5*a* of the conductive surface 5 may be coupled to the further section(s) 5*b* of the conductive surface 5 by means of at least one of a conductive connection, a capacitive connection, and an inductive connection, the connection 7 extending across one of the longitudinal slots 6*a* or one of the lateral slots 6*b*, as shown in FIG. 1*c*.

The slot antenna 1 may comprise one connection 7, as shown in FIG. 1*b*, or several connections 7, as shown in FIG. 1*c*. There may be one or more inductive or capacitive connections realized by, e.g., inductors and capacitors such as inductive vias, inter-digital capacitors, etc. FIG. 1*c* shows an inductive connection 7 extending over a lateral slot 6*b* and a capacitive connection 7 extending over a longitudinal slot 6*a*.

The first conductive structure 2 may be substantially plate shaped, as shown in FIGS. 2*a* to 2*c*. It may be completely planar, as shown in FIG. 2*a*, or is may be curved, as shown in FIGS. 2*b* and 2*c*.

In one embodiment, the slot antenna 1 comprises a cavity 8, indicated by a dashed line in FIGS. 1*a* to 1*c*. The cavity 8 may have dimensions corresponding to the area covered by the non-conductive pattern 6, or have dimensions larger than the area covered by the non-conductive pattern 6, as indicated by the above-mentioned dashed line. The first conductive structure 2 and the second conductive structure 3 form the boundaries of the cavity 8, as shown in FIGS. 2*a* to 2*c*. The first conductive structure 2 is arranged such that the non-conductive pattern 6 is juxtaposed with the cavity 8.

As shown in FIGS. 1*c* and 2*a*, the conductive surface 5 may extend past the conductive pattern 6. In this case, the border against the second conductive structure extends between two volumes of conductive material. As shown in FIGS. 1*a*, 1*b*, 2*b*, and 2*c*, the border between first conductive structure 2 and the second conductive structure 3 may extend at the conductive pattern 6 itself, such that the second conductive structure 3 directly borders the conductive pattern 6, i.e. the border against the second conductive structure extends between one volume of non-conductive material and one volume of conductive material.

The cavity 8 may be essentially rectangular, as shown in FIG. 2*a*, or have any arbitrary shape with, e.g., a varying cross-section along the direction of the longitudinal slots 6*a*. The cavity 8 has conductive walls, which may be formed by different materials, e.g. a metal frame and a battery, or a metal frame and a display. The cavity 8 may have openings to other volumes outside the cavity 8 without disturbing the operation of the slot antenna 1. Furthermore, the cavity 8 may house other components such as buttons, a speaker, or the display.

The cavity 8 may be formed in a conductive environment, such as aluminum, by a milling process. The cavity 8 may thereafter be partially of fully filled with a non-conductive material such as a dielectric material, e.g. by means of insert-molded plastic. The non-conductive pattern 6, i.e. the longitudinal slots 6*a* and the lateral slots 6*b*, can be realized by the same milling process.

Alternatively, the conductive surface 5 of the first conductive structure 2 may be configured by means of conductive paint, painted onto a surface of the non-conductive material filling the cavity 8, as shown in FIGS. 3*a* to 4*b*, leaving unpainted areas which form the non-conductive pattern 6.

In one embodiment, the conductive surface 5 of the first conductive structure 2 is configured by means of a layer of flexible, conductive sheet material, connected to the second conductive structure 3 by means of an adhesive. In such an embodiment, there is no need for a cavity 8. The non-conductive pattern 6 is formed as grooves in the sheet material, the sheet material covering any recess 13 and/or gap 14 formed in the second conductive structure 3 or between the second conductive structure 3 and a further conductive component 10.

The slot antenna 1 may further comprise at least one floating parasitic plate 15, preferably at least two floating parasitic plates 15, extending essentially parallel to the conductive surface 5 of the first conductive structure 2. The floating parasitic plate 15 is at least partially juxtaposed with the first section 5*a* or the further section 5*b* of the conductive surface 5. In an embodiment comprising two floating parasitic plates 15, one floating parasitic plate 15 is at least partially juxtaposed with the first section 5*a* of the conductive surface 5, and the other floating parasitic plate 15 is at least partially juxtaposed with the further section 5*b* of the conductive surface 5. The floating parasitic plate 15 is not galvanically connected to any conductive structure.

In one embodiment, the juxtaposed floating parasitic plate 15 has the same surface area as the corresponding first section 5*a* or the corresponding further section 5*b*. In one embodiment, the dimension of each juxtaposed floating parasitic plate 15 is larger than the dimension of the corresponding first section 5*a* or the corresponding further section 5*b*, in the longitudinal direction of the longitudinal slot 6*a*. This is indicated in FIG. 6*b*. In a further embodiment, the dimension of each juxtaposed floating parasitic plate 15 is smaller than the dimension of the corresponding first section 5*a* or the corresponding further section 5*b*, in the longitudinal direction of the longitudinal slot 6*a*.

In an embodiment comprising two floating parasitic plates 15, as shown in FIGS. 6*a* to 6*c*, the floating parasitic plates 15 may be identical or have different configurations. In one embodiment, the dimension of one of the two floating parasitic plates 15 is larger than the dimension of the other of the two floating parasitic plates 15, in the longitudinal direction of the longitudinal slot 6*a*.

The floating parasitic plate 15 is preferably much longer in the longitudinal direction of the longitudinal slot 6*a* than in the direction of the lateral slot 6*b*, allowing the slot antenna 1 to be configured having a small width and thickness, and a, relatively speaking, far larger length.

The floating parasitic plate 15 is preferably separated from the conductive surface 5 by means of a non-conductive insulator layer or an air gap, preferably less than 1 mm high.

In one embodiment, an antenna feed 4 is coupled to the first conductive structure 2 by means of at least one of a conductive connection, a capacitive connection, and an inductive connection, the connection extending across one of the longitudinal slots 6*a*, as shown in FIGS. 1*a* and 1*b*, or one of the lateral slots 6*b*, as shown in FIG. 1*c*. Furthermore, the antenna feed 4 may be realized using a flexible printed circuit board or a liquid crystal polymer board attached from the top with a screw, in which case additional surface-mount devices (SMD) can be used near the antenna feed 4. The antenna feed 4 can be realized at any location within the slot antenna in a way such that the reference ground, i.e. the starting point of the antenna feed 4, has a conductive connection to the conductive surroundings, e.g. conductive walls of the cavity 8 discussed below.

In a further embodiment, the slot antenna 1 comprises two antenna feeds 4, as shown in FIGS. 6*a* and 6*c*. A first antenna feed 4*a* is coupled to the floating parasitic plate 15 by means of a capacitive connection, and a second antenna feed 4*b* is coupled to the cavity 8 by means of an inductive connection. The slot antenna 1 may, as shown in FIG. 6*c*, also comprise a capacitive grounding strip 17 coupled to the floating parasitic plate 15. The capacitive antenna feed 4*a* and the capacitive grounding strip 17 excite the resonant frequencies of the floating parasitic plate 15, while the inductive antenna feed 4*b* excites a further resonant frequency, typically at lower bands than the floating parasitic plate 15.

Figure 5:
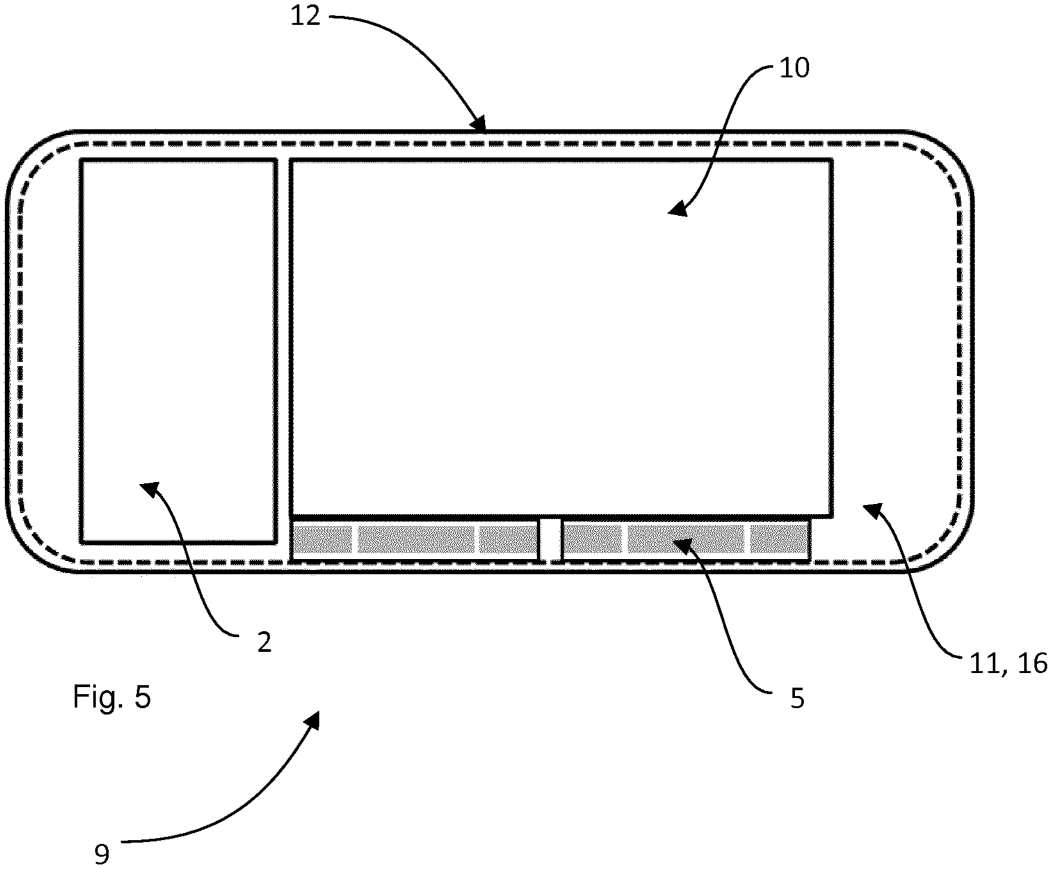
FIG. 5 shows a schematic cross-sectional view of an electronic device in accordance with one embodiment of the present invention.

The present invention further relates to an electronic device 9, shown in FIG. 5, the electronic device 9 comprising a plurality of electronic components 10, a glass cover 16, a display 11, a frame 12, and at least one slot antenna 1 as described above. The glass cover 16 covers and protects the display 11, such that the glass cover 16, the display 11 and the frame 12 enclose the electronic components 10 and, at least partially, the slot antenna 1.

In one embodiment, the floating parasitic plate 15 of the slot antenna 1 is fixedly connected to a surface of the glass cover 16 facing the first conductive structure 2 of the slot antenna 1, by means of adhesive or mechanical means.

Figure 4B:
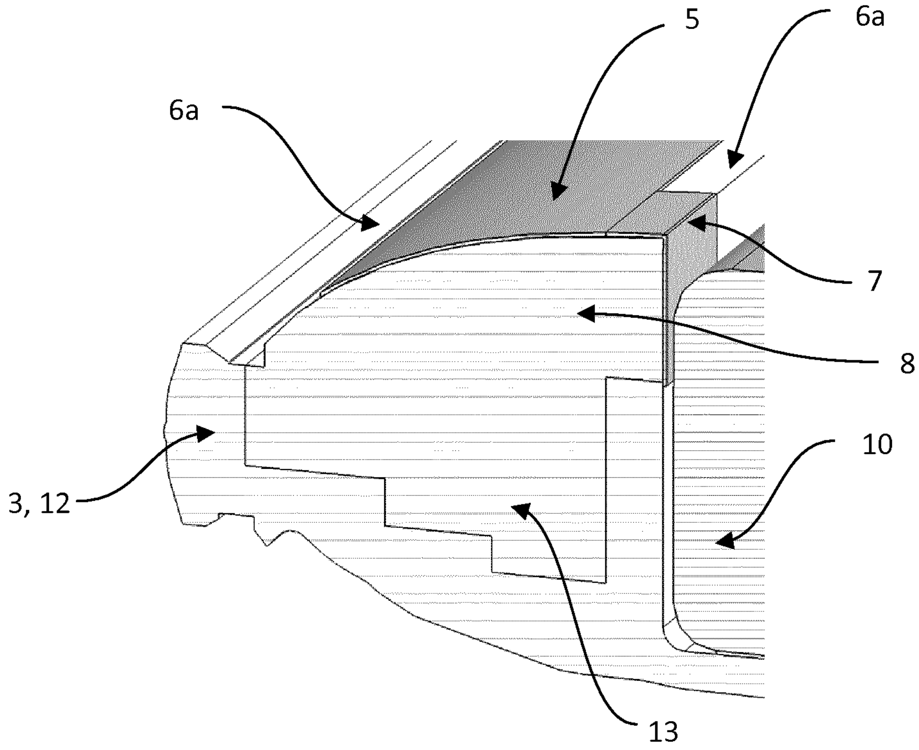
FIG. 4*b* shows a partial cross-sectional view of the embodiment of FIG. 4*a;*

The second conductive structure 3 of the slot antenna 1 comprising one, or several, of the display 11, the frame 12, and the electronic components 10. As shown in FIGS. 3*b* and 4*b*, the second conductive structure 3 may comprise the frame 12 and at least one electronic component 10, e.g. in the form of a battery. A gap 14, extending between the frame 12 and the electronic component 10, is at least partially bridged by the first conductive structure 2. One longitudinal slot 6*a* extends, in FIGS. 3*b* and 4*b*, between the conductive surface 5 and the frame 12, and one longitudinal slot 6*a* extends between the conductive surface 5 and the frame 12 as well as electronic component 10.

In one embodiment, the frame 12 comprises the second conductive structure 3 of the slot antenna 1, and the frame 12 comprises a recess 13 at least partially bridged by the first conductive structure 2 of the slot antenna 1, as shown in FIGS. 3*b* and 4*b*. In a further embodiment, the second conductive structure 3 of the slot antenna 1 comprises the frame 12 and at least one electronic component 10.

The longitudinal slots 6*a* of the first conductive structure 2 extend in parallel with a longitudinal extension of the frame 12, i.e. in parallel with the longitudinal extension of the electronic device 9 and in parallel with the longitudinal extension of the recess 13 and/or the gap 14. The longitudinal slot 6*a* may extend adjacent the frame 12 or adjacent an electronic component 10 such as the battery.

The antenna feed 4 may be coupled to the first conductive structure 2 by means of a flexible printed circuit board or a liquid crystal polymer board and a screw, as shown in FIG. 3*a*. Furthermore, the first conductive structure 2 of the slot antenna 1 may be a printed circuit board, a flexible printed circuit board, or a liquid crystal polymer board.

In one embodiment, the slot antenna 1 comprises a rectangular cavity 8, the longitudinal slots 6*a* having a length of 0.67λ, the lateral slots 6*b* having a length of 0.10λ, and the depth of the longitudinal slots 6*a* and lateral slots 6*b* being 0.08λ where λ is the free space wavelength at 3.8 GHz. The longitudinal slots 6*a* have a width of 0.003λ and the lateral slots 6*b* have a width of 0.006λ. The dielectric material filling the cavity 8 has a relative permittivity of 2.9.

In a further embodiment, wherein the antenna feed is realized with a flexible printed circuit board, the longitudinal slots 6*a* have a length of 0.41λ, the lateral slots 6*b* having a length of 0.07λ, and the depth of the longitudinal slots 6*a* and lateral slots 6*b* is 0.06λ. The dielectric material filling the cavity 8 has a relative permittivity of 2.9.

The electronic device 1 may comprise a matching circuit in order to achieve the desired return loss. In one embodiment, the matching circuit is located directly in the antenna feed 4 in close proximity to the conductive structure 5*a*. Furthermore, at least a part of the matching circuit may be implemented within capacitive grounding strip 17.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. An antenna comprising:
- an antenna feed;
- a second conductive structure; and
- a first conductive structure at least partially enclosed by the second conductive structure and coupled to the antenna feed, wherein the first conductive structure comprises:
  - a conductive surface; and
  - a non-conductive pattern comprising:
    - a longitudinal slot; and
    - a lateral slot extending at an angle from the longitudinal slot, and wherein an electrical connection extends across a portion of the non-conductive pattern.

2. The antenna of claim 1, wherein the non-conductive pattern partially encloses the conductive surface and further comprises:
- two longitudinal slots extending in parallel; and
- two lateral slots interconnecting the two longitudinal slots.

3. The antenna of claim 2, wherein the first conductive structure is further coupled to the second conductive structure using the electrical connection comprising a conductive connection that extends across one of the two longitudinal slots.

4. The antenna of claim 1, wherein the conductive surface comprises:
- a first section; and
- a second section, and
- wherein the non-conductive pattern partially separate the first section from the second section.

5. The antenna of claim 4, wherein the non-conductive pattern encloses the first section.

6. The antenna of claim 4, wherein the first section is coupled to the second section using the electrical connection comprising at least one of a conductive connection, a capacitive connection, or an inductive connection, and wherein each of the conductive connection, the capacitive connection, and the inductive connection extends across one of the longitudinal slot or the lateral slot.

7. The antenna of claim 4, wherein the lateral slot completely separates the first section from the second section.

8. The antenna of claim 1, wherein the antenna feed is further coupled to the first conductive structure using the electrical connection comprising at least one of a conductive connection, a capacitive connection, or an inductive connection, and wherein each of the conductive connection, the capacitive connection, and the inductive connection extends across one of the longitudinal slot or the lateral slot.

9. The antenna of claim 1, wherein the first conductive structure is of a plate shape.

10. The antenna of claim 1, further comprising a cavity, wherein the first conductive structure and the second conductive structure form boundaries of the cavity, and wherein the first conductive structure is arranged to juxtapose the non-conductive pattern with the cavity.

11. The antenna of claim 10, wherein the cavity is partially filled with a non-conductive material.

12. The antenna of claim 1, wherein the first conductive structure further comprises a layer of flexible conductive sheet material.

13. An antenna comprising:
- an antenna feed;
- a second conductive structure; and
- a first conductive structure at least partially enclosed by the second conductive structure and coupled to the antenna feed, wherein the first conductive structure comprises:
  - a conductive surface; and
  - a non-conductive pattern comprising:
    - a longitudinal slot; and
    - a lateral slot extending at an angle from the longitudinal slot, and wherein the non-conductive pattern completely encloses the conductive surface.

14. The antenna of claim 13, further comprising: two longitudinal slots extending in parallel, and two lateral slots interconnecting the two longitudinal slots.

15. The antenna of claim 13, wherein the conductive surface comprises a first section, and a second section.

16. The antenna of claim 15, wherein the first section is coupled to the second section using an electrical connection comprising at least one of a conductive connection, a capacitive connection, or an inductive connection, and wherein each of the conductive connection, the capacitive connection, and the inductive connection extends across one of the longitudinal slot or the lateral slot.

17. The antenna of claim 15, wherein the lateral slot completely separates the first section from the second section.

18. The antenna of claim 13, wherein the first conductive structure is of a plate shape.

19. The antenna of claim 13, wherein the first conductive structure further comprises a layer of flexible conductive sheet material.

20. An electronic device comprising:
a plurality of electronic components;
a glass cover;
a display;
a frame; and
an antenna comprising:
an antenna feed;
a second conductive structure including at least one of the display, the frame, or the electronic components; and
a first conductive structure at least partially enclosed by the second conductive structure and coupled to the antenna feed, wherein the first conductive structure comprises:
a conductive surface; and
a non-conductive pattern comprising:
a longitudinal slot; and
a lateral slot extending at an approximately perpendicular angle from the longitudinal slot,
wherein an electrical connection extends across a portion of the non-conductive pattern, and
wherein the glass cover, the display, and the frame enclose the electronic components and partially enclose the antenna.

21. The electronic device of claim 20, wherein the first conductive structure is a printed circuit board, a flexible printed circuit board, or a liquid crystal polymer board.

22. The electronic device of claim 20, wherein the frame comprises the second conductive structure and a recess that is partially bridged by the first conductive structure.

23. The electronic device of claim 20, wherein the second conductive structure comprises the frame and at least one of the electronic components, wherein a gap is formed between the frame and the at least one of the electronic components, and wherein the gap is partially bridged by the first conductive structure.

24. The electronic device of claim 23, wherein the at least one of the electronic components is a battery.

25. The electronic device of claim 20, wherein the longitudinal slot extends in parallel with a longitudinal extension of the frame.

26. The electronic device of claim 20, wherein the antenna feed is further coupled to the first conductive structure using a flexible printed circuit board or a liquid crystal polymer board and a screw.

* * * * *